(12) United States Patent  
Reijonen et al.

(10) Patent No.: US 9,320,128 B2  
(45) Date of Patent: Apr. 19, 2016

(54) WELL-LOGGING APPARATUS WITH RING-SHAPED RESISTORS AND RELATED METHODS

(71) Applicant: Schlumberger Technology Corporation, Sugar Land, TX (US)

(72) Inventors: Jani Petteri Reijonen, Princeton, NJ (US); Marc-Andre de Looz, Lawrence, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 218 days.

(21) Appl. No.: 13/830,071

(22) Filed: Mar. 14, 2013

(65) Prior Publication Data

US 2013/0256521 A1      Oct. 3, 2013

Related U.S. Application Data

(60) Provisional application No. 61/617,289, filed on Mar. 29, 2012.

(51) Int. Cl.
| | |
|---|---|
| G01V 5/04 | (2006.01) |
| H05H 5/04 | (2006.01) |
| G01V 5/08 | (2006.01) |
| H05H 7/22 | (2006.01) |
| H05H 5/06 | (2006.01) |

(52) U.S. Cl.
CPC .. *H05H 5/04* (2013.01); *G01V 5/08* (2013.01); *H05H 5/06* (2013.01); *H05H 7/22* (2013.01); *Y10T 29/49117* (2015.01)

(58) Field of Classification Search
CPC .............. H05H 5/04; H05H 7/22; H05H 5/06

USPC .......................... 250/256; 315/506; 313/360.1
See application file for complete search history.

(56) References Cited

U.S. PATENT DOCUMENTS

| 3,036,963 | A | * | 5/1962 | Christofilos ................ 376/126 |
| 3,924,138 | A | | 12/1975 | Hopkinson | |
| 5,059,859 | A | * | 10/1991 | Endo et al. .................... 313/443 |
| 6,297,507 | B1 | | 10/2001 | Chen et al. | |
| 2009/0039804 | A1 | * | 2/2009 | Nishino et al. ................. 315/506 |
| 2009/0224701 | A1 | * | 9/2009 | Morita et al. .................. 315/506 |
| 2012/0063558 | A1 | * | 3/2012 | Reijonen et al. ............... 376/108 |

FOREIGN PATENT DOCUMENTS

| GB | 724441 | 2/1955 |
| RU | 2316835 C1 | 2/2008 |

OTHER PUBLICATIONS

International Search Report and Written Opinion for International Application No. PCT/US2013/034514 dated Jul. 10, 2013.

* cited by examiner

*Primary Examiner* — David J Makiya  
*Assistant Examiner* — Kenneth J Malkowski  
(74) *Attorney, Agent, or Firm* — Michael Dee

(57) ABSTRACT

A well-logging apparatus may include a charged particle source, a target electrode, and an accelerator column. The accelerator column may include a housing extending between the charged particle source and the target electrode, a series of spaced apart accelerator electrodes carried by the housing, a series of ring-shaped resistors surrounding the housing, and a respective connector coupling adjacent ones of the series of ring-shaped resistors together and to a corresponding one of the series of spaced apart accelerator electrodes.

12 Claims, 11 Drawing Sheets

WELL-LOGGING APPARATUS WITH RING-SHAPED RESISTORS AND RELATED METHODS

RELATED APPLICATIONS

This application is based upon prior filed copending provisional application Ser. No. 61/617,289 filed Mar. 29, 2012, the entire subject matter of which is incorporated herein by reference in its entirety.

BACKGROUND

To determine a porosity of a subterranean formation, it may be desirable to make several simultaneous measurements. One tool for measuring porosity is based on neutron transport through the subterranean formation. The neutron flux attenuated with distance from the source may depend strongly on the hydrogen content of the subterranean formation. For a neutron source, radioactive chemical sources or accelerator based sources are used in existing tools.

If pore spaces are filled by liquid, the higher porosity corresponds to a higher hydrogen index. The detected neutron counts are generally lower in this case. A properly calibrated tool may increase the accuracy of the porosity measurement in liquid-filled formations if the matrix composition is known. However, the measurement may be affected by various environmental conditions.

On the other hand, the same measurement may be less accurate for gas-filled subterranean formations when the hydrogen content in the pore spaces is lower due to the relatively low density of the gas. A density measurement may address this ambiguity. For the same porosity of the subterranean formation, the gas-filled and liquid-filled matrices have different densities.

A charged particle accelerator may include multiple electrodes at different potentials. To charge the electrodes, a voltage source may be used. The voltage source is coupled to a voltage divider, and different outputs of the voltage divider are in turn coupled to different electrodes. Currently, such a voltage divider is constructed by soldering resistors onto conductive traces on a housing of the electron accelerator.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A well-logging apparatus may include a charged particle source, a target electrode, and an accelerator column. The accelerator column may include a housing extending between the charged particle source and the target electrode, a series of spaced apart accelerator electrodes carried by the housing, a series of ring-shaped resistors surrounding the housing, and a respective connector coupling adjacent ones of the series of ring-shaped resistors together and to a corresponding one of the series of spaced apart accelerator electrodes.

DETAILED DESCRIPTION

Figure 1:
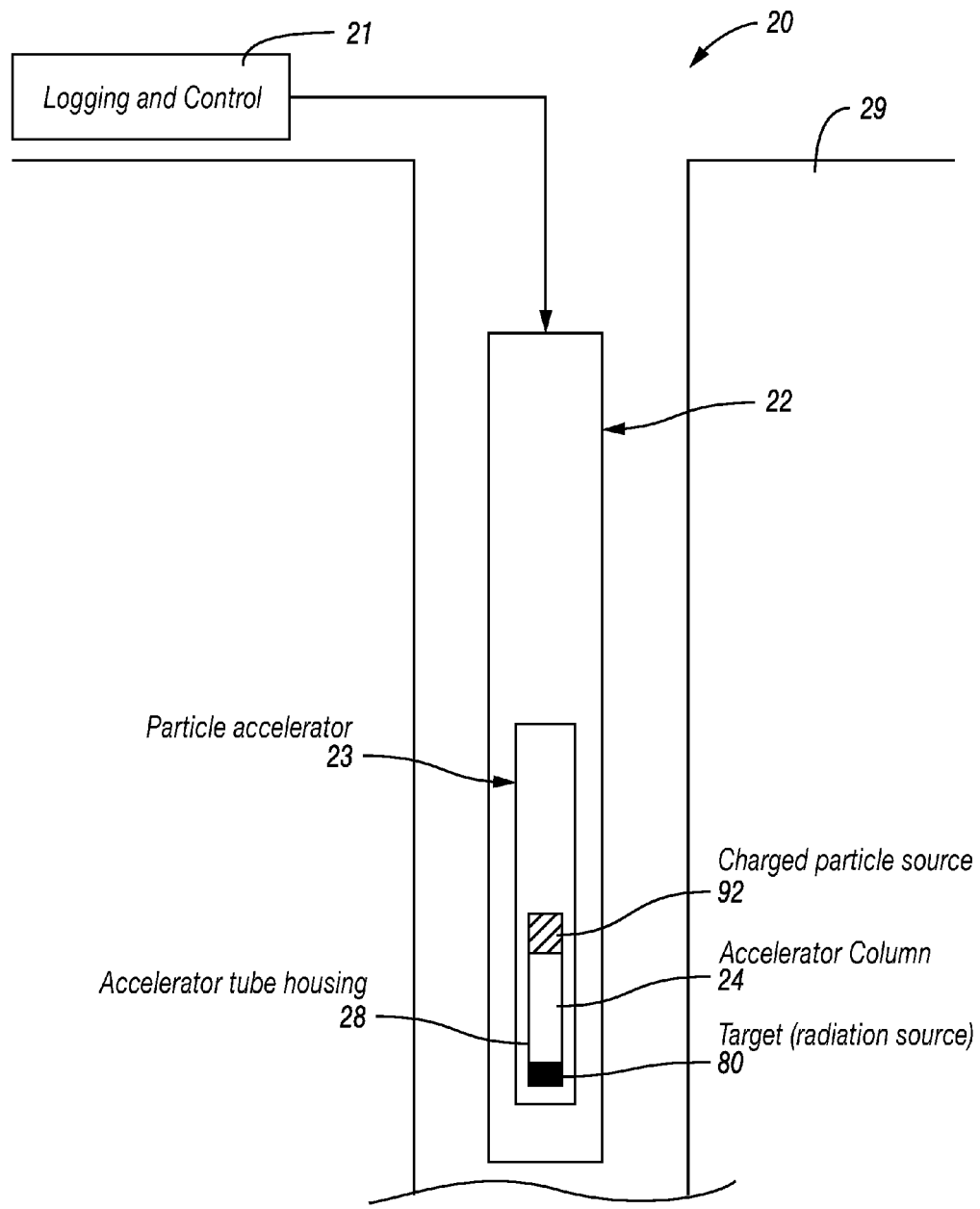
FIG. 1 is a schematic diagram of an embodiment of a well-logging system, according to the present disclosure.
Figure 2:
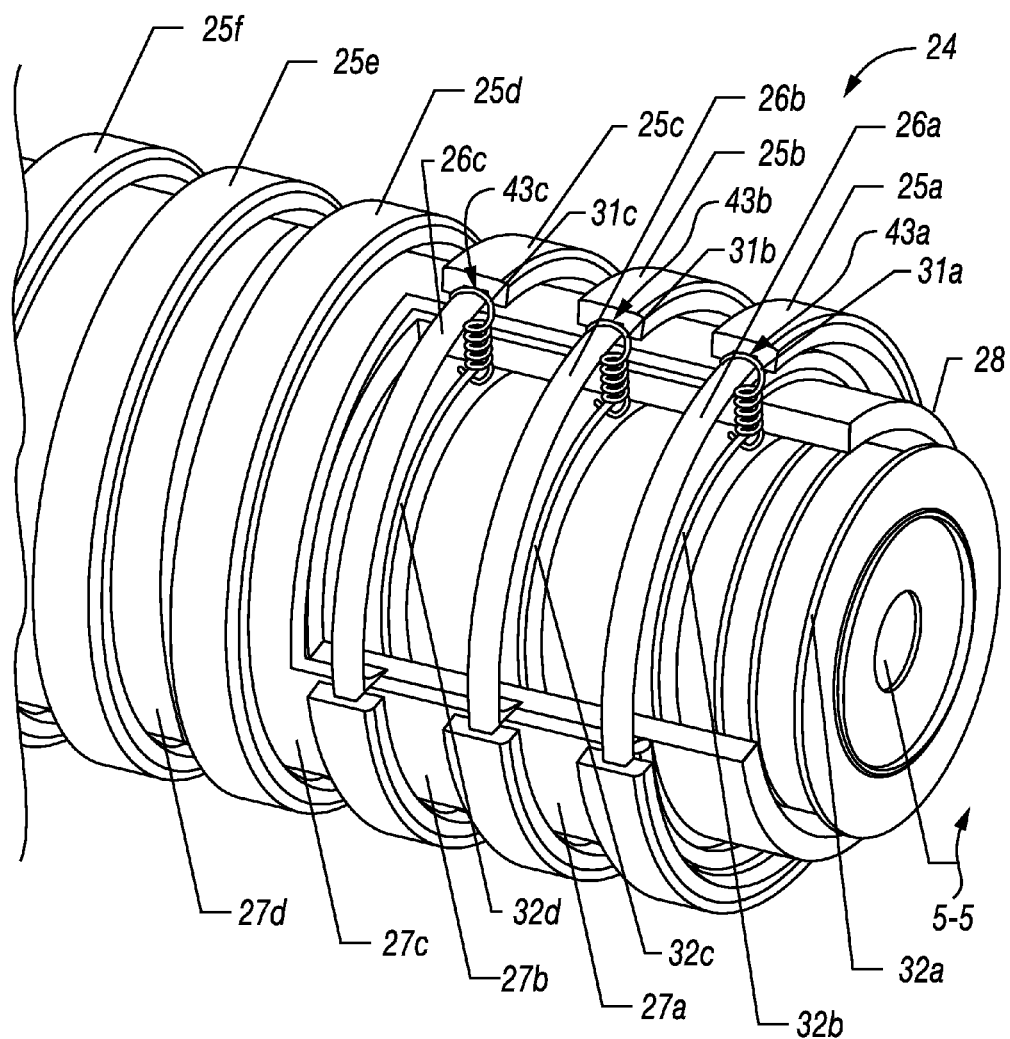
FIG. 2 is a cutaway perspective view of the accelerator column of FIG. 1.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

One or more embodiments of the present disclosure will be described below. These described embodiments are only examples of the presently disclosed techniques. Additionally, in an effort to provide a concise description, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally speaking, a well-logging apparatus may include a charged particle accelerator, which may be used to generate x-rays or neutrons. The accelerator column may include a high voltage source and an accelerator tube installed in a housing. The accelerator tube may include a tube envelope extending between the charged particle source and the target electrode, spaced apart accelerator electrodes carried by the housing, ring-shaped resistors surrounding the housing, and a respective connector coupling adjacent ones of the ring-shaped resistors together and to a corresponding one of the spaced apart accelerator electrodes.

Referring now to FIGS. 1-7, a well-logging system 20 according to the present disclosure is now described. The well-logging system 20 illustratively includes a well-logging apparatus 22 inserted into a wellbore in a subterranean formation 29, and a logging and control device 21 on the surface of the subterranean formation and coupled to the well-logging apparatus. In other embodiments, the logging and control device may be integrated in the well-logging apparatus 22, such as Logging While Drilling (LWD) applications.

The well-logging apparatus 22 includes a particle accelerator (e.g. particle accelerator) 23 comprising an accelerator column 24, a charged particle source 92 adjacent the accelerator column, and a target electrode (i.e. radiation source) 80 at an opposite end of the accelerator column. The accelerator column 24 is between the charged particle source 92 and the target electrode 80. As will be appreciated, the accelerator column 24 defines an electric field that accelerates charged particles (e.g. electron or positively charged particles, such as deuterons or tritons) along a path of travel 41 (FIG. 5) from the charged particle source 92 to the target electrode 80. As will be appreciated, some elements from the well-logging apparatus 22 have been omitted from the drawings for clarity. For example, the accelerator tube may include a gas reservoir providing an ionizable gas for the charged particle source 92 (ion source) in a housing (i.e. accelerator tube backbone) 28, an electron emitting cathode and associated cathode grid adjacent the gas reservoir, and an extractor electrode between the target electrode 80 and the accelerator column 24.

The accelerator column 24 illustratively includes the housing 28 extending between the charged particle source 92 (i.e. the generator of the charged particles) and the target electrode 80, and a series of spaced apart accelerator electrodes 32a-32d carried by the housing. In particular, the series of spaced apart accelerator electrodes 32a-32d may be carried on the interior of the housing 28. In the illustrated embodiment, the accelerator electrodes 32a-32d comprise conductive rings encircling the path of travel 41. The series of spaced apart accelerator electrodes 32a-32d have corresponding voltages applied thereto to provide the aforementioned voltage ramp.

In the illustrated embodiment, the accelerator electrodes 32a-32d are protruding from the accelerator tube insulator surface. For example, the accelerator tube may comprise a stack of insulator rings and accelerator electrodes 32a-32d brazed together.

The accelerator column 24 illustratively includes a series of ring-shaped resistors (tube shaped or cylindrical shaped) 27a-27f surrounding the housing 28, and a respective connector 43a-43c (FIG. 2) coupling adjacent ones of the series of ring-shaped resistors together and to a corresponding one of the series of spaced apart accelerator electrodes 32a-32d. The ring-shaped resistors 27a-27f may have a helical shape in some embodiments. In other embodiments, the ring-shaped resistors 27a-27f may have cylindrical shapes.

In other words, the connectors 43a-43c provide an electrically connection between the electrically conductive rings 26a-26g and thus the adjacent ring-shaped resistors 27a-27f and the respective accelerator electrode 32a-32d. The series of ring-shaped resistors 27a-27f are coupled in series and define an accelerator column for providing the corresponding voltages for the series of spaced apart accelerator electrodes 32a-32d. The accelerator includes a voltage source (not shown) coupled to the ring-shaped resistors 27a-27f.

As will be appreciated, depending on the charged particle, the electric field may proceed from a negative or positive voltage (order of 100 or 100s kV) to a reference voltage (e.g. ground) at the end (i.e. adjacent a target electrode 80). In other embodiments, the electric field may proceed from the reference voltage (e.g. ground) to a positive or negative voltage. In yet other embodiments, neither target electrode 80 nor charged particle source 92 may be at the reference potential (e.g. ground), rather one of the intermediate electrodes may be as in a bipolar accelerator configuration. Each ring-shaped resistor 27a-27f in the series may have the same resistance value or may have a varying resistance value. This flexibility may permit application of specific voltage drops at the accelerator electrodes 32a-32d down the length of the accelerator column 24. For example, the voltage drop across the series of accelerator electrodes 32a-32d may be uniform or may vary. Indeed, this may provide a plug-and-play versatility to adjust the potential distribution of the accelerator column 24.

Figure 3:
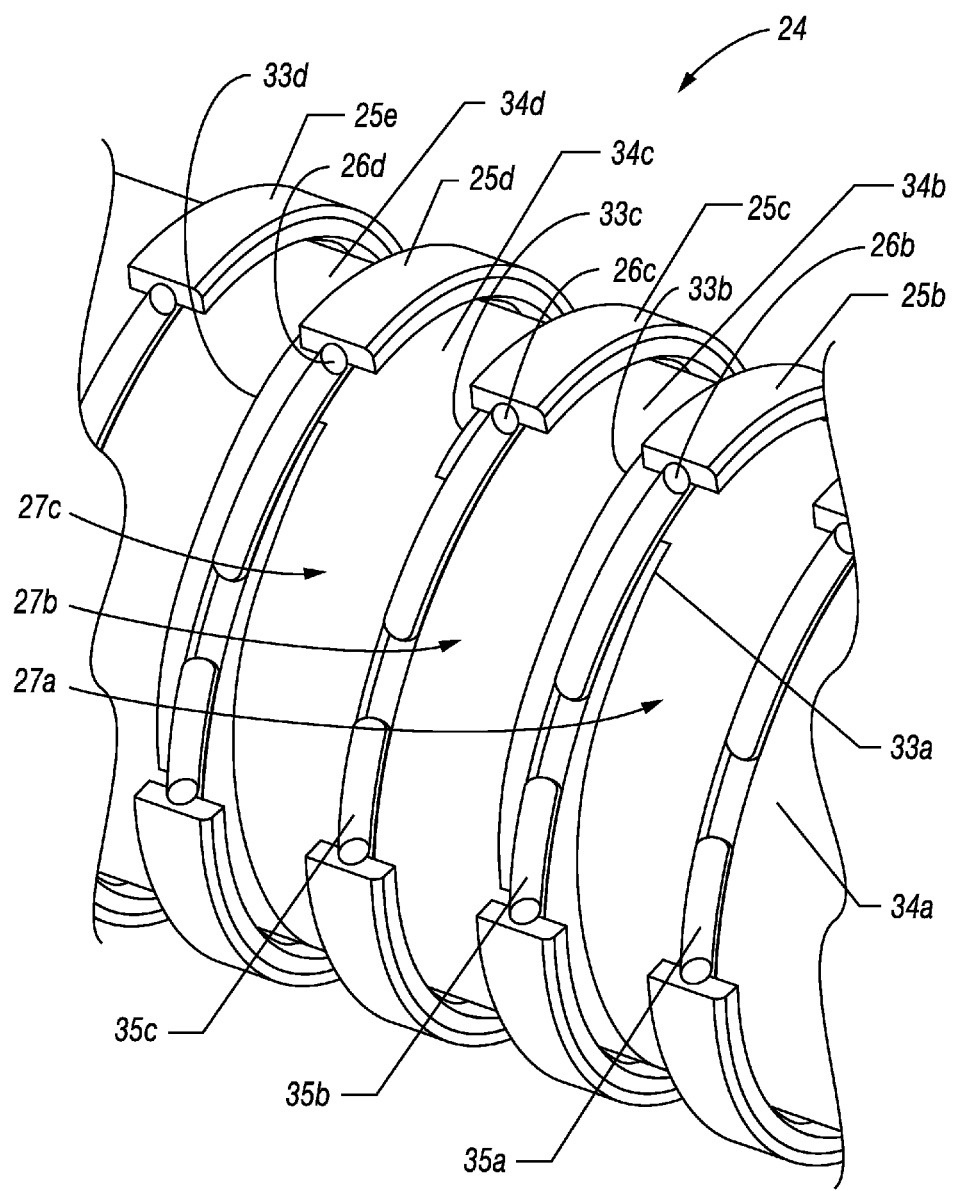
FIG. 3 is another cutaway perspective view of the accelerator column of FIG. 1.
Figure 4:
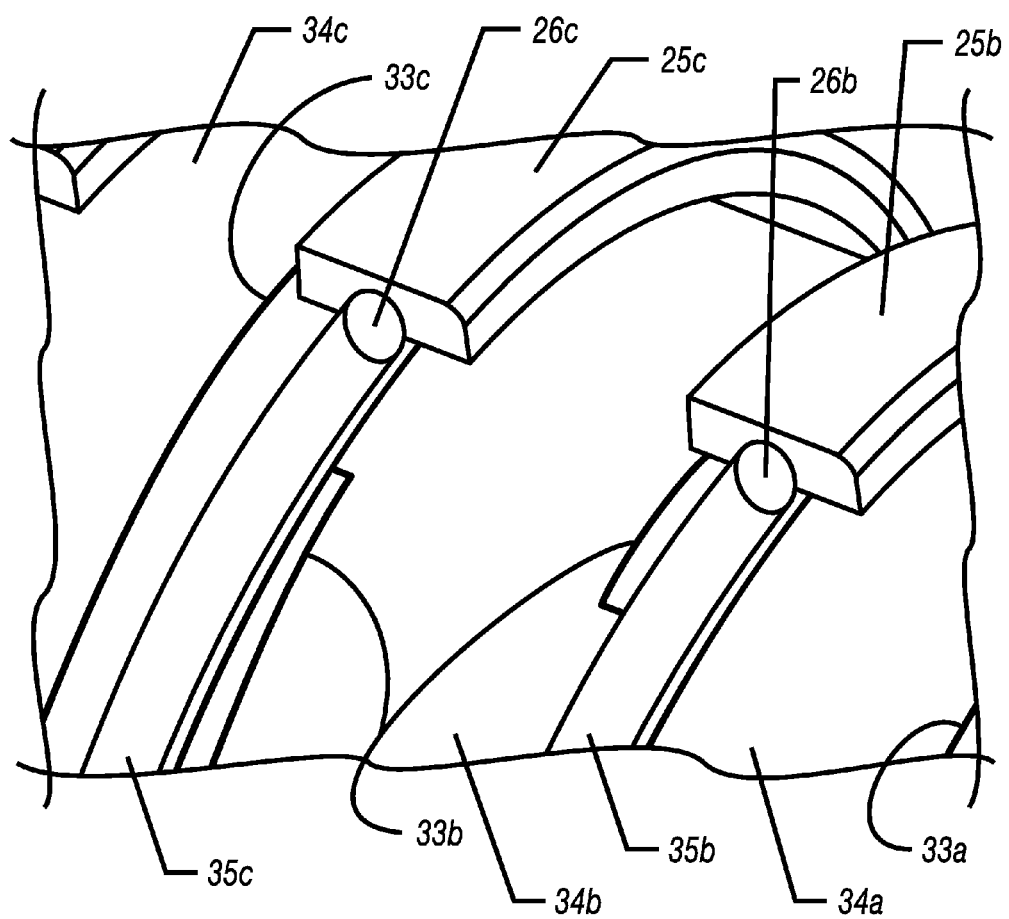
FIG. 4 is an enlarged perspective view of the accelerator column of FIG. 1.

In particular and as perhaps best seen in FIG. 4, each ring-shaped resistor 27a-27f comprises a dielectric substrate 34a-34d, and a resistive trace 33a-33f thereon. For example, the dielectric substrate 34a-34d comprises a ceramic material (such as alumina, i.e. aluminum oxide), and each resistive trace 33a-33f may comprise aluminum, for example. Also, as perhaps best seen in FIG. 3, the resistive trace 33a-33f comprises an electrically resistive trace (e.g. tantalum nitride, ruthenium oxide, etc.) arranged in a spiral around the dielectric substrate 34a-34d. The resistive trace 33a-33f may comprise a material with a low temperature coefficient so that the current drawn is independent of temperature.

In the illustrated embodiment, each adjacent pair of the series of ring-shaped resistors 27a-27f has recessed edges defining a channel 35a-35g. In the illustrated embodiment, each connector 43a-43c comprises an electrically conductive ring 26a-26g coupling the adjacent ones of the series of ring-shaped resistors 27a-27f by sitting in the channel 35a-35g and providing an electrical path between the grooves of adjacent ring-shaped resistors 27a-27f. In other words, the adjacent pairs of ring-shaped resistors 27a-27f receive a corresponding one of the electrically conductive rings 26a-26g. For example, the electrically conductive rings 26a-26g may comprise canted coil springs.

In the illustrated embodiment, each adjacent pair of ring-shaped resistors 27a-27f defines a tongue and groove mechanical interface defining the channel 35a-35g. One ring-shaped resistor 27a-27f defines the (electrically conductive material plated surface) tongue and the other ring-shaped resistor defines the groove (or notch, not having electrically conductive material plated thereon) receiving the tongue. The channel 35a-35g is illustratively plated with an electrically conductive surface, for example, material comprising aluminum, copper. The resistive traces 33a-33f illustratively spiral from one end's electrically conductive tongue portion of the channel 35a-35g to the opposing end's electrically conductive tongue portion, which defines the next channel.

As perhaps best seen in FIGS. 3-4, the channel 35a-35g defined by the adjacent pair of the series of ring-shaped resistors 27a-27f is not continuous, i.e. there is a gap. In other embodiments, the gap may be quite small so that the electrically conductive rings 26a-26g remain in contact with a near continuous channel 35a-35g. The electrically conductive rings 26a-26g provide a mechanical link between adjacent pairs of ring-shaped resistors 27a-27f by fitting into the channel 35a-35g defined therebetween.

Each electrically conductive ring 26a-26g defines a resistor tap point in the accelerator column. Additionally, the connectors 43a-43c also comprise an electrically conductive link 31a-31c coupling the corresponding one of the accelerator electrodes 32a-32d to a corresponding tap point. In the illustrated embodiment, the electrically conductive links 31a-31c each comprises an electrically conductive spring. Although not shown, the housing 28 may include a plurality of openings aligned with the electrically conductive links 31a-31c so that there is access to the series of spaced apart accelerator electrodes 32a-32d. Moreover, using the loose tolerances in the tongue and groove interface of the ring-shaped resistors 27a-27f, the electrically conductive links 31a-31c may pass through gaps between the ring-shaped resistors. In embodiments where the electrically conductive links 31a-31c comprise springs, the springs may aid in maintaining the position of the electrically conductive rings 26a-26g by providing radially inward force thereby also maintaining a solid electrical connection between the adjacent pairs of the ring-shaped resistors 27a-27f.

Additionally, the accelerator column 24 further comprises a plurality of spaced apart dielectric spacers 42a-42f (FIGS. 8A-8D) between the housing 28 and the adjacent ones of the series of ring-shaped resistors 27a-27f. In some embodiments, the spaced apart dielectric spacers 42a-42f may comprise rubber O-rings surrounding the housing 28. During operation, the well-logging apparatus 22 may be exposed to a wide range of operating temperatures, causing the housing 28 and other components to expand. In some embodiments where the ring-shaped resistors 27a-27f and the housing 28 comprise different materials (i.e. different coefficients of thermal expansion), the expansion displacement may inadvertently cause the housing to apply stress to the ring-shaped resistors. The spaced apart dielectric spacers 42a-42f may provide some mechanical give between the housing 28 and the ring-shaped resistors 27a-27f and reduce stress therebetween. Also, the dielectric spacers 42a-42f may dampen shock and vibration to the ring-shaped resistors 27a-27f during use of the accelerator column 24.

Also, each connector 43a-43c illustratively includes a corona ring 25a-25f surrounding the electrically conductive ring 26a-26g. In other embodiments, the corona rings 25a-25f may be omitted. For example, the corona rings 25a-25f may comprise aluminum, stainless steel, or titanium. As will be appreciated, the corona rings 25a-25f provide electromagnetic shielding and improve performance, i.e. protecting the resistive traces 33a-33f from field emissions caused by the strong potential between adjacent electrodes and between the electrodes and the grounded metal housing of the particle accelerator 23

Figure 5:
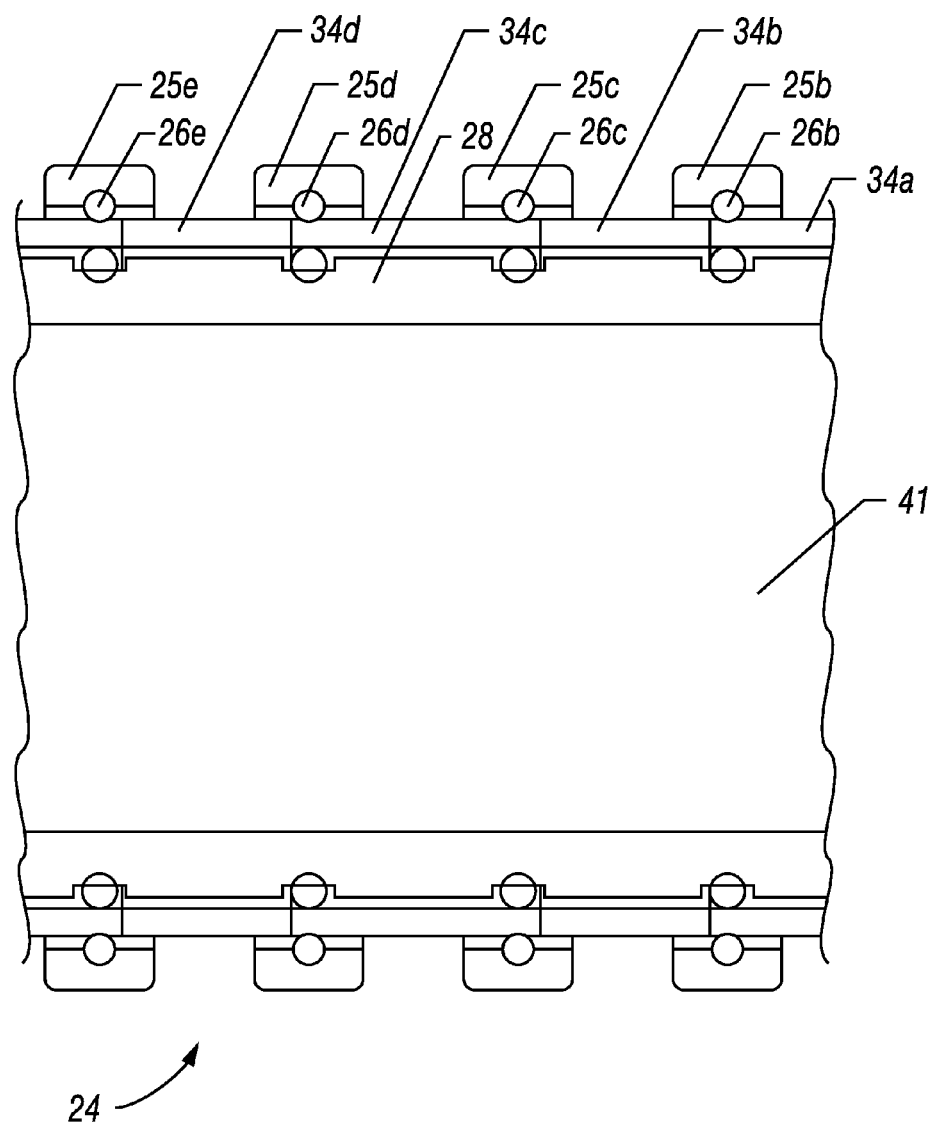
FIG. 5 is a cross-sectional view of the accelerator column of FIG. 1 taken along line 5-5.
Figure 6:
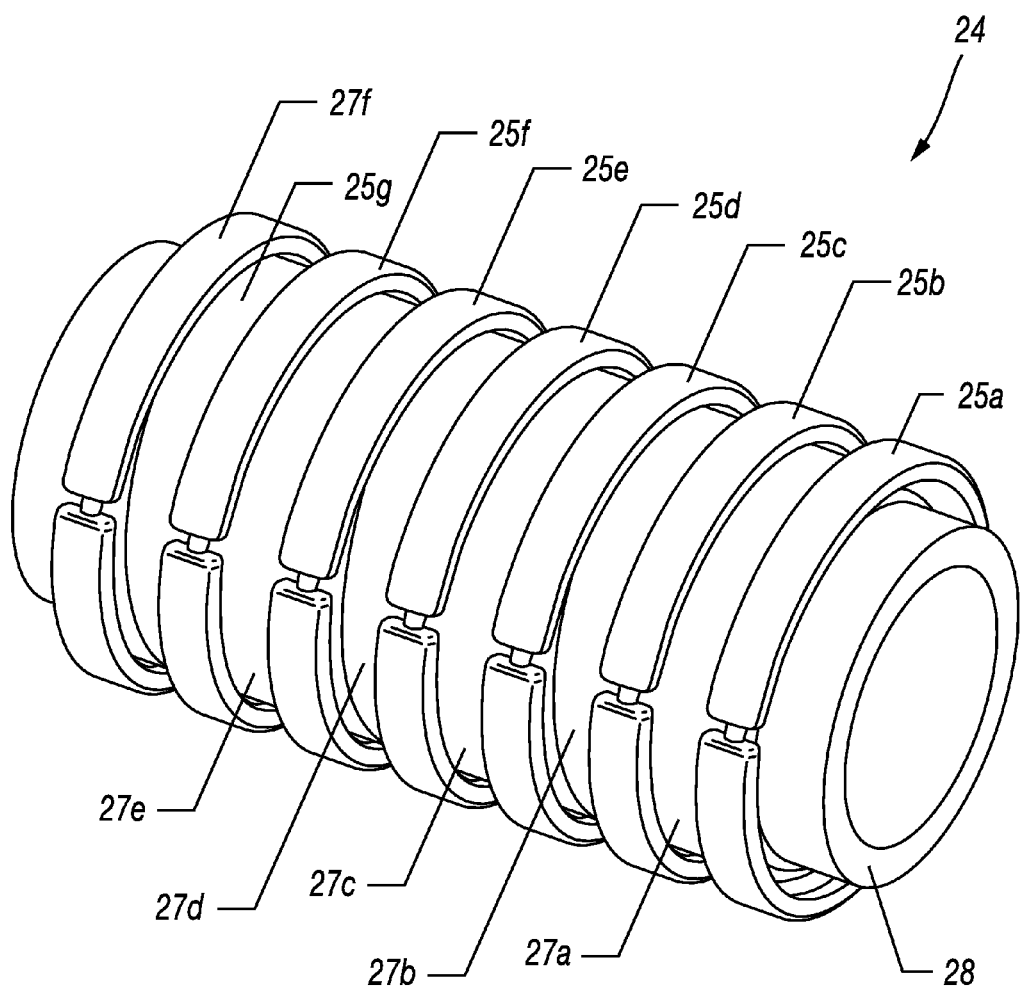
FIG. 6 is another perspective view of the accelerator column of FIG. 1.
Figure 7:
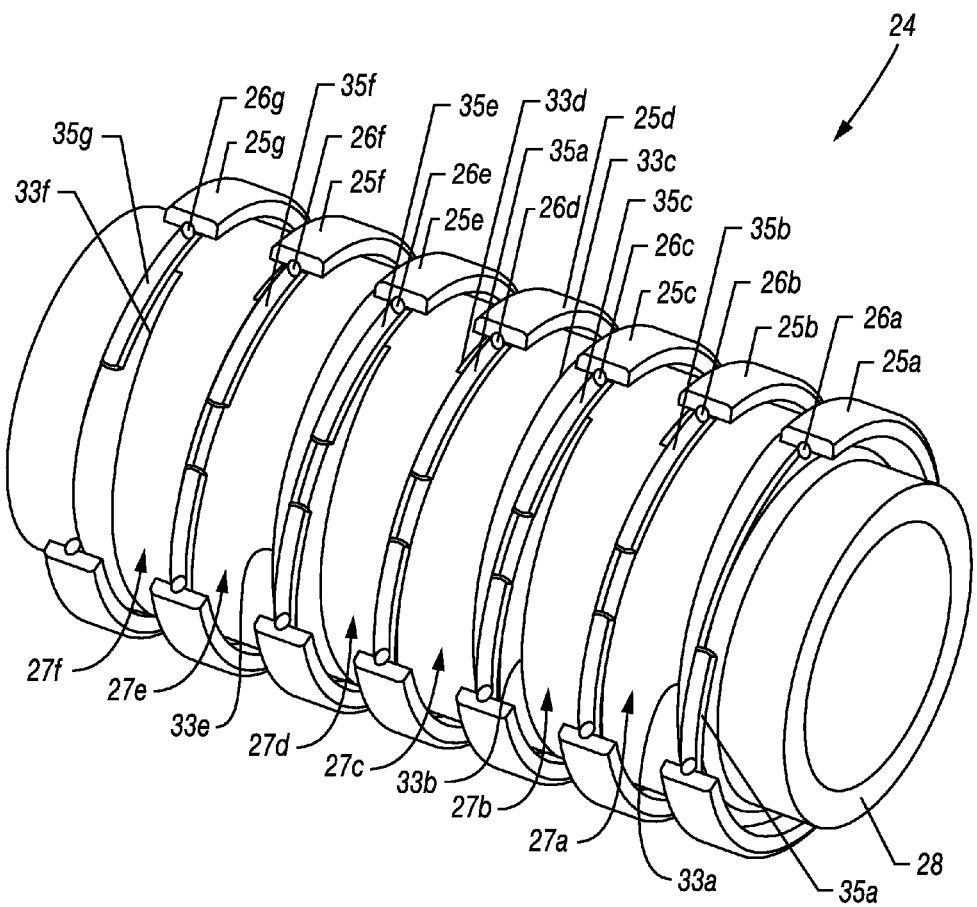
FIG. 7 is another cutaway perspective view of the accelerator column of FIG. 1.
Figure 8A:
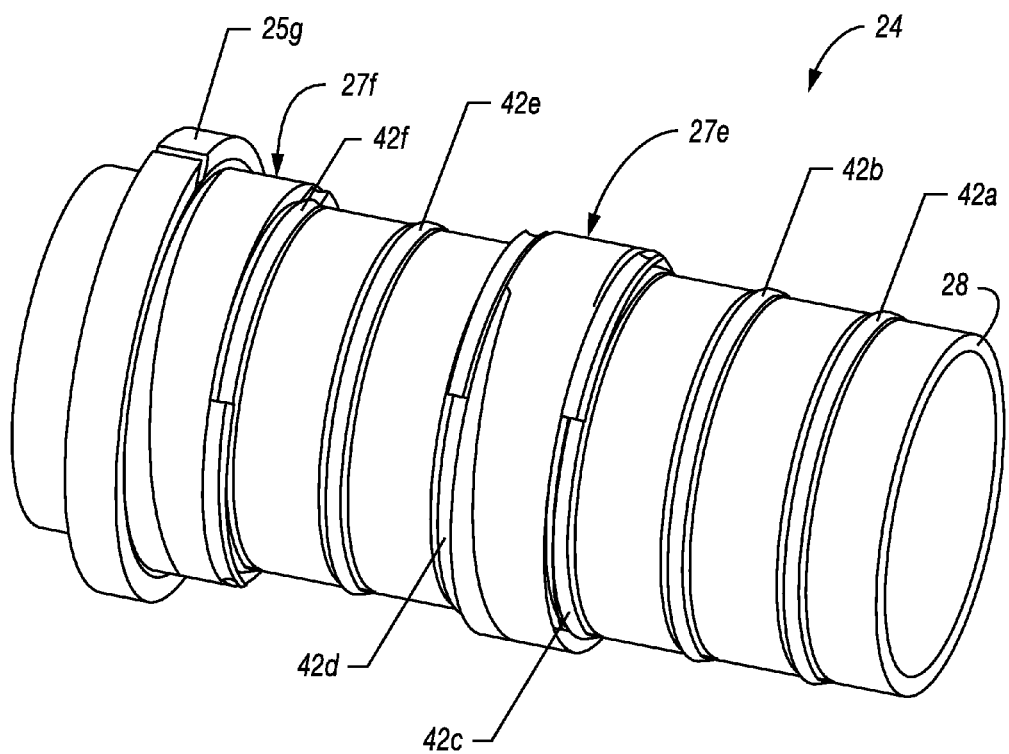
FIGS. 8A-8D are perspective views of the accelerator column of FIG. 1 during assembly.
Figure 8B:
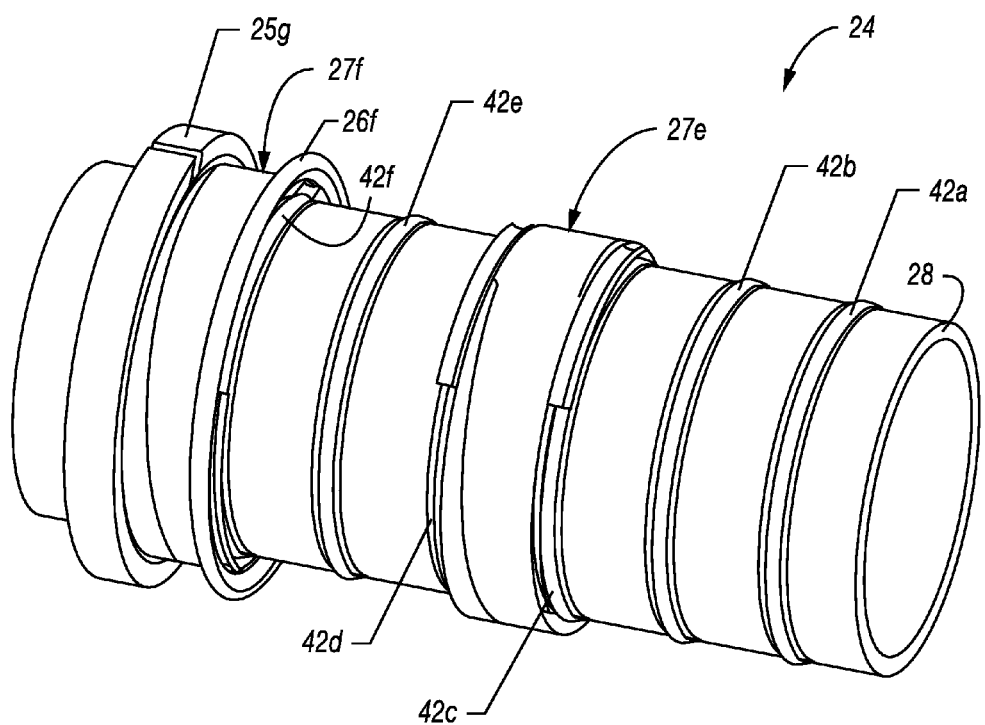
Figure 8C:
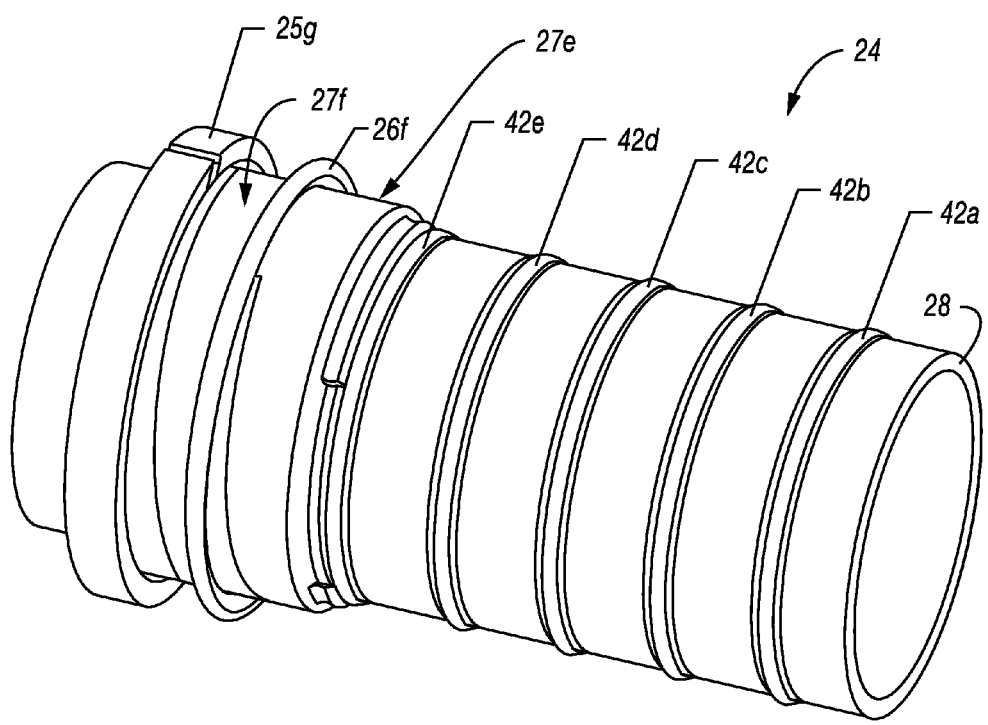
Figure 8D:
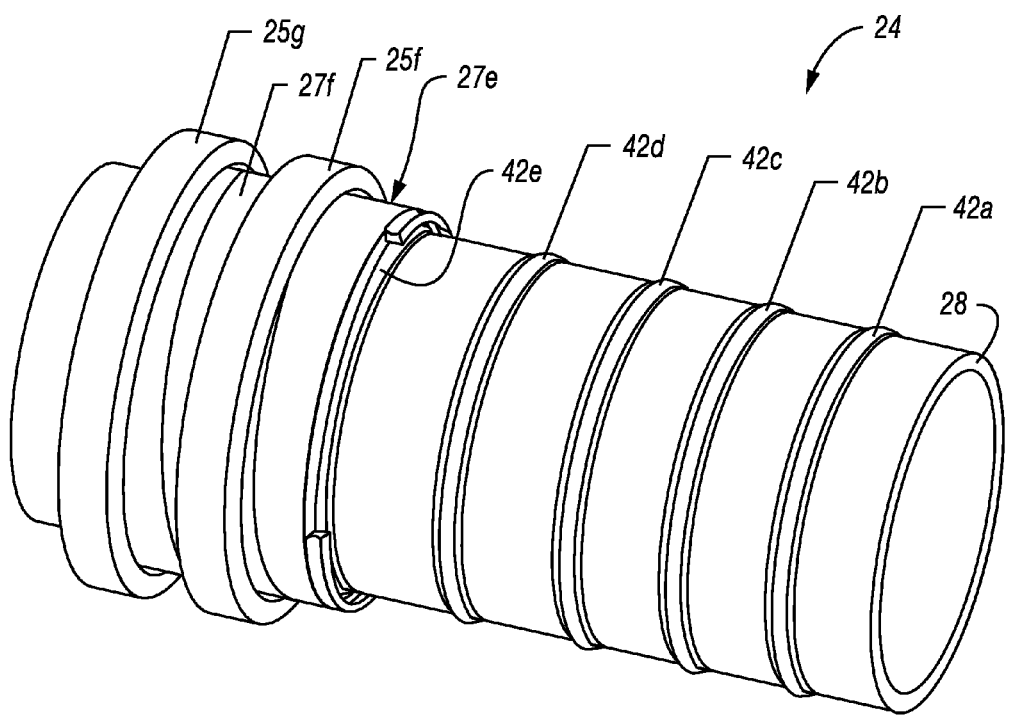

As perhaps best seen in FIG. 5, each corona ring 25a-25f illustratively includes a recess on an inner radial surface thereof for providing a mechanical coupling to the electrically conductive ring 26a-26g, i.e. a snap-on fitting. Given this illustrated direct mechanical coupling to the electrically conductive ring 26a-26g, the corona rings 25a-25g are at the same potential as their respective electrically conductive rings. Of course, in other embodiments, the corona rings 25a-25f using other approaches.

Another aspect is directed to an accelerator column 24 for a well-logging apparatus 22. The accelerator column 24 may include a housing 28 to extend between a charged particle source 92 and a target electrode 80, a series of spaced apart accelerator electrodes 32a-32d carried by the housing, a series of ring-shaped resistors 27a-27f surrounding the housing, and a respective connector 43a-43c coupling adjacent ones of the series of ring-shaped resistors together and to a corresponding one of the series of spaced apart accelerator electrodes.

Another aspect is directed to a method for making the accelerator column 24 for charged particles. The method includes coupling a series of spaced apart accelerator electrodes 32a-32d along a housing 28, coupling a series of ring-shaped resistors 27a-27f to surround the housing, and coupling a respective connector 43a-43c between adjacent ones of the series of ring-shaped resistors and to a corresponding one of the series of spaced apart accelerator electrodes.

Helpfully, the accelerator column 24 may be readily assembled without using small jewelry screws and substantial amounts of soldering and using less manual labor. Further, the accelerator column 24 may readily configured for varying applications by varying the number of ring-shaped resistors 27a-27f and the resistance of each one.

Referring now additionally to FIGS. 8A-8D, a method for making the accelerator column 24 is now described. In particular, the method includes first positioning (sliding) a first ring-shaped resistor 27f onto the housing 28, and coupling a respective connector 43a-43c. The coupling of the connector 43a-43c comprises positioning an electrically conductive link 31a-31c through the housing 28 and to be coupled to the accelerator electrodes 32a-32d, and positioning a first electrically conductive ring 26g in a channel 35a-35g partially defined by the first ring-shaped resistor 27f. Then, the first corona ring 25g may be installed on the first electrically conductive ring 26g.

The method includes positioned a second ring-shaped resistor 27e onto the housing 28, and fitting the respective tongue into the groove of the first ring-shaped resistor 27f, which completes the channel 35a-35g between the first and second ring-shaped resistors 27e-27f and defines a resistor tap point. The method also includes fitting a second corona ring 25f onto the second electrically conductive ring 26f. Subsequent resistors are installed in the same fashion as the second resistor.

Portions of each edge of the substrates 34a-34d are metallized and coupled to their respective resistor traces 33a-33f. Since portions of the edges are metallized, and not the entire edge, the un-metallized areas of each edge form a notch. The metallized edges and notches are shaped such that the metallized edge of one ring-shaped resistor 27a-27f may fit into the notch of another ring-shaped resistor to establish mechanical contact, and/or to align the ring-shaped resistors. The alignment of the metallized edges and notches may be such that the conductive rings "see" one nearly continuous metallized groove.

While one particular way of mechanically coupling the electrically conductive rings 26a-26g to the spaced apart accelerator electrodes 32a-32d is illustrated, those of skill in the art will recognize that other ways of mechanically coupling the electrically conductive rings to the accelerator electrodes are usable and are within the scope of this disclosure. For example, instead of spring connectors, there may be wires long so as to maintain electrical contact when the distance between the housing 28 and the electrically conductive rings 26a-26g changes. These wires may be spot welded to the accelerator electrodes 32a-32d, then hooked around the corona rings 25a-25f, or may be spot welded to the corona rings as well.

Since the electrical connections made between the resistors of the accelerator column 24 are mechanical, soldering is not performed during assembly. Due to this lack of soldering, and the ease of sliding the ring-shaped resistors 27a-27f onto the housing 28, installation time of this accelerator column on the housing is reduced compared to prior approaches. This also enables quick replacement of a broken resistor, as well as quick testing of ring-shaped resistors 27a-27f so as to match sets of resistors to each other.

While the disclosure has been described with respect to a limited number of embodiments, those skilled in the art, having benefit of this disclosure, will appreciate that other embodiments can be envisioned that do not depart from the scope of the disclosure as disclosed herein.

That which is claimed is:
1. A well-logging apparatus comprising:
   a charged particle source;
   a target electrode; and
   an accelerator column comprising
   a housing extending between said charged particle source and said target electrode,
   a series of spaced apart accelerator electrodes carried by said housing,
   a series of ring-shaped resistors surrounding said housing, and
   a respective connector coupling adjacent ones of said series of ring-shaped resistors together and to a corresponding one of said series of spaced apart accelerator electrodes;
   wherein each connector comprises:
       an electrically conductive ring coupling the adjacent ones of said series of ring-shaped resistors and defining a resistor tap point; and
       at least one electrically conductive link coupling the corresponding one of said accelerator electrodes to a corresponding tap point; and wherein the adjacent ones of said series of ring-shaped resistors have recessed edges defining a channel to receive a corresponding one of said electrically conductive rings.

2. The well-logging apparatus of claim 1, wherein the ring-shaped resistors have generally cylindrical or tube shapes surrounding said housing.

3. The well-logging apparatus according to claim 1 wherein each ring-shaped resistor comprises a dielectric substrate and a resistive trace thereon.

4. The well-logging apparatus according to claim 3 said dielectric substrate comprises a ceramic material.

5. The well-logging apparatus according to claim 3 wherein said resistive trace comprises an electrically resistive trace arranged in a spiral around said dielectric substrate.

6. The well-logging apparatus according to claim 1 wherein said at least one electrically conductive link comprises at least one electrically conductive spring.

7. The well-logging apparatus according to claim 1 wherein each connector comprises a corona ring surrounding said electrically conductive ring.

8. The well-logging apparatus according to claim 1 wherein said accelerator column comprises a plurality of spaced apart dielectric spacers between said housing and the adjacent ones of said series of ring-shaped resistors.

9. A method for making an accelerator column for charged particles comprising:

coupling a series of spaced apart accelerator electrodes along a housing;

coupling a series of ring-shaped resistors to surround the housing, wherein each respective ring-shaped resistor is radially contiguous around an axial position along the accelerator column; and coupling a respective connector between adjacent ones of the series of ring-shaped resistors and to a corresponding one of the series of spaced apart accelerator electrodes, wherein coupling the respective connector comprises:

positioning an electrically conductive ring to couple the adjacent ones of the series of ring-shaped resistors and defining a resistor tap point; and using at least one electrically conductive link to couple the one of the accelerator electrodes to a corresponding tap point, and wherein adjacent ones of the series of ring-shaped resistors have recessed edges defining a channel to receive a corresponding one of the electrically conductive rings.

10. The method according to claim 9 wherein each ring-shaped resistor comprises a dielectric substrate and a resistive trace thereon.

11. The method according to claim 10 the dielectric substrate comprises a ceramic material.

12. The method according to claim 9 comprising coupling a corona ring to surround the electrically conductive ring.

\* \* \* \* \*